(12) United States Patent  (10) Patent No.: US 10,916,948 B2
Sugeno et al.                  (45) Date of Patent: Feb. 9, 2021

(54) POWER CONTROL APPARATUS AND POWER CONTROL METHOD

(71) Applicant: MURATA MANUFACTURING CO., LTD., Kyoto (JP)

(72) Inventors: Naoyuki Sugeno, Kyoto (JP); Koji Umetsu, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/678,528

(22) Filed: Nov. 8, 2019

(65) Prior Publication Data

US 2020/0076231 A1  Mar. 5, 2020

Related U.S. Application Data

(63) Continuation of application No. PCT/JP2018/014681, filed on Apr. 6, 2018.

(30) Foreign Application Priority Data

May 11, 2017   (JP) ................................ 2017-094368

(51) Int. Cl.
    *H02J 3/38*    (2006.01)
    *H02J 9/06*    (2006.01)
    (Continued)

(52) U.S. Cl.
    CPC .............. *H02J 3/388* (2020.01); *H02J 3/472* (2020.01); *H02J 9/062* (2013.01); *H02J 9/08* (2013.01)

(58) Field of Classification Search
    CPC ...... H02J 3/388; H02J 9/08; H02J 7/34; H02J 9/062; H02J 9/066; H02J 3/472
    See application file for complete search history.

(56) References Cited

U.S. PATENT DOCUMENTS

2007/0152506 A1   7/2007  Meyers et al.
2011/0291483 A1*  12/2011 Yamane .................... H02J 9/06
                                                       307/65
(Continued)

FOREIGN PATENT DOCUMENTS

JP    2009-219204      9/2009
JP    2009219204 A     9/2009
(Continued)

OTHER PUBLICATIONS

Chae, Wookyu, et al. "Cooperative operation method of two battery systems at microgrid system." 2012 3rd IEEE International Symposium on Power Electronics for Distributed Generation Systems (PEDG). IEEE, 2012. (Year: 2012).*

(Continued)

*Primary Examiner* — Ryan Johnson
(74) *Attorney, Agent, or Firm* — K&L Gates LLP

(57) ABSTRACT

A power control apparatus has a switch configured to interrupt power supply from a system power when the switch has detected a drop of voltage from the system power below a threshold, a first power controller configured to receive a voltage drop signal supplied from the switch unit, a first power storage unit connected to the first power controller, a second power controller configured to receive a discharge start signal supplied from the first power controller, a second power storage unit connected to the second power controller, and a rotary machine generator that receives an operation control signal supplied from the second power controller or the second power storage unit.

16 Claims, 9 Drawing Sheets

(51) Int. Cl.
*H02J 9/08* (2006.01)
*H02J 3/46* (2006.01)

(56) References Cited

U.S. PATENT DOCUMENTS

2013/0221896 A1 8/2013 Dong
2019/0181643 A1* 6/2019 Chae ..................... H02J 3/382

FOREIGN PATENT DOCUMENTS

| JP | 2013-121205 | 6/2013 |
| JP | 2013121205 A | 6/2013 |
| JP | 2105-080279 | 4/2015 |
| JP | 2015080279 A | 4/2015 |
| WO | 2016/034086 | 3/2016 |

OTHER PUBLICATIONS

International Search Report for Application No. PCT/JP2018/014681, dated Jun. 19, 2018.
Extended European Search Report dated Sep. 9, 2020 in corresponding European Application No. 18798501.5.

* cited by examiner

POWER CONTROL APPARATUS AND POWER CONTROL METHOD

CROSS REFERENCE TO RELATED APPLICATIONS

The present application is a continuation of PCT patent application no. PCT/JP2018/014681, filed on Apr. 6, 2018, which claims priority to Japanese patent application no. JP2017-094368 filed on May 11, 2017, the entire contents of which are being incorporated herein by reference.

BACKGROUND

The present technology generally relates to a power control apparatus and a power control method.

There is known a phenomenon called so-called momentary voltage drop (hereinafter referred to as momentary drop as appropriate) in which voltage from a system power (commercial power supply) drops momentarily. Although the momentary drop is mostly caused by natural phenomena such as lightening, wind and rain, and ice and snow, it can also be caused by birds and animals or human error. When a momentary drop occurs, a production line of a production plant may stop, and there is a risk that product manufacturing defects or equipment damage may occur. In addition, what is called power failure may occur where the voltage continues to decrease. For this reason, it is desired to construct a power supply system corresponding to an abnormality of the system power.

SUMMARY

The present technology generally relates to a power control apparatus and a power control method.

In such a field, it is desired to construct a system that can reliably supply power to a load when an abnormality occurs in power supply from a system power.

Therefore, it is an object of the present technology to provide a power control apparatus and a power control method that can reliably supply power to a load when an abnormality occurs in power supply from the system power.

According to an embodiment of the present technology, a power control apparatus is provided. The power control apparatus includes:

a switch configured to interrupt power supply from a system power when the switch detects a drop of voltage from the system power below a threshold;

a first power controller configured to receive a voltage drop signal supplied from the switch;

a first power storage unit connected to the first power controller;

a second power controller configured to receive a discharge start signal supplied from the first power controller;

a second power storage unit connected to the second power controller; and a rotary machine generator configured to receive an operation control signal supplied from the second power controller or the second power storage unit.

According to an embodiment of the present technology, a power control method is provided. The power control method includes:

by a switch, interrupting power supply from a system power and outputting a voltage drop signal when the switch detects a drop of voltage from the system power below a threshold;

by a first power controller, performing control to supply power to a load from a first power storage unit and outputting a discharge start signal when the first power controller receives the voltage drop signal;

by a second power controller, performing control to supply power to the load from a second power storage unit when the second power controller receives the discharge start signal; and by a rotary machine generator, starting operation to supply power to the load when the rotary machine generator receives an operation control signal from the second power controller or the second power storage unit.

According to at least an embodiment of the present technology, when an abnormality occurs in power supply from a system power, power can be reliably supplied to a load. It should be understood that the effect described here is not necessarily limited and may be any effect described in the present technology. Further, the contents of the present technology are not interpreted as being limited by the exemplified effects.

DETAILED DESCRIPTION

As described herein, the present disclosure: be described based on examples with reference to the drawings, but the present disclosure is not to be considered limited to the examples, and various numerical values and materials in the examples are considered by way of example.

Figure 1:
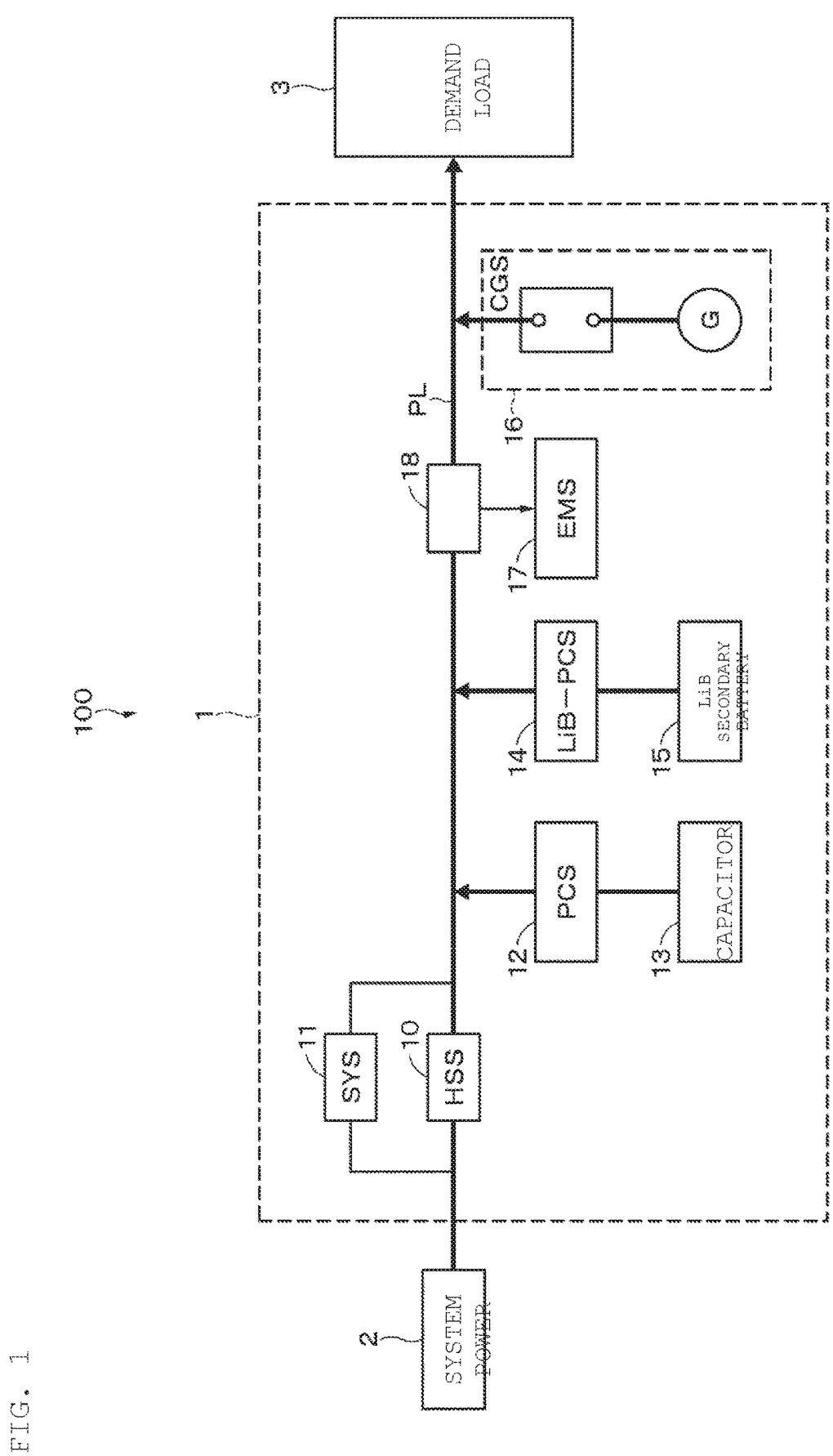
FIG. 1 is a block diagram illustrating a configuration example of a power supply system according to an embodiment of the present technology.

FIG. 1 illustrates a configuration example of a power supply system 100 according to one embodiment of the present technology. The power supply system 100 includes, for example, a power control apparatus 1, a system power 2, and a demand load (hereinafter referred to as a load as appropriate) 3. Power is supplied from the system power 2 to the load 3 through the power control apparatus 1. The load 3 is, for example, a factory or a building that produces semiconductors or the like, but is not limited thereto. In FIG. 1, the flow of electric power is indicated by a thick line.

The power control apparatus 1 according to one embodiment is an apparatus for preventing occurrence of an adverse effect on the load 3 due to a momentary drop or a long-time power failure. The momentary drop is a phenomenon that voltage from the system power 2 drops momentarily (for example, less than 1 second (about 2 ms (milliseconds) as a more specific example)).

A configuration example of the power control apparatus 1 will be described. The power control apparatus 1 includes a high speed switch (HSS) 10 that is an example of a switch, a synchronous system (SYS) 11 that is an example of a synchronization controller, a power conditioning system (PCS) 12 that is an example of a first power controller, a capacitor 13 that is an example of a first power storage unit, a lithium ion battery (LiB)-PCS 14, an LiB secondary battery 15 that is an example of a second power storage unit, a rotary machine generator 16, an energy management system (EMS) 17, and a power measuring device 18. In the present embodiment, the second power controller is constituted of the LiB-PCS 14 and the EMS 17.

The HSS 10 and the power measuring device 18 are connected to a power supply line PL from the system power 2 to the load 3. The SYS 11 is connected in parallel to the HSS 10. The PCS 12 is connected to the power supply line PL. The PCS 12 is connected to the capacitor 13 and is configured so that power output from the capacitor 13 can be supplied to the load 3 according to control by the PCS 12. The LiB-PCS 14 is connected to the power supply line PL. The LiB-PCS 14 is connected to the LiB secondary battery 15, and is configured so that power output from the LiB secondary battery 15 can be supplied to the load 3 according to control by the LiB-PCS 14. A rotary machine generator 16 is connected to the power supply line PL, and is configured so that power output from the rotary machine generator 16 can be supplied to the load 3.

The HSS 10 is a switch unit that turns on and off power supply between the system power 2 and the load 3. The HSS 10 has a monitoring function for monitoring voltage supplied from the system power 2, a communication function for communicating with the PCS 12, and so on, and has a configuration of a microcomputer, a communication unit, and so on for executing these functions. When the HSS 10 detects that the voltage supplied from the system power 2 has dropped below a predetermined threshold, the HSS 10 quickly interrupts power supply from the system power 2. Further, the HSS 10 outputs a signal indicating that the voltage from the system power 2 has dropped below the predetermined threshold (hereinafter referred to as a voltage drop signal VS as appropriate) to the PCS 12.

When voltage supplied from the system power 2 drops below the threshold and then this voltage recovers, the SYS 11 turns on the HSS 10 after synchronizing a voltage cycle of the system power 2 with a voltage cycle of voltage supplied to the load 3 at a time when voltage of the system power 2 has recovered. For example, the SYS 11 performs the synchronization by matching a zero cross of the voltage cycle of the system power 2 with a zero cross of the voltage cycle of the voltage that is supplied to the load 3 at a time when the voltage of the system power 2 has recovered. In addition, at a time when the voltage of the system power 2 has recovered, cases are conceivable where power of only the LiB secondary battery 15 is supplied to the load 3, power is supplied from the LiB secondary battery 15 and the rotary machine generator 16 to the load 3, and only power of the rotary machine generator 16 is supplied to the load 3.

The PCS 12, for example, has a function of controlling output of the capacitor 13, a function of converting DC power of the capacitor 13 into AC power and supplying the AC power to the load 3, a communication function, and the like, and has a configuration of a microcomputer, a converter, a communication unit, and the like for executing these functions. When the PCS 12 has received the voltage drop signal VS from the HSS 10, the PCS 12 performs control to supply power from the capacitor 13 to the load 3, and outputs a discharge start signal DS.

The capacitor 13 is, for example, an electric double layer capacitor, and is a power storage unit that outputs DC power. In addition, besides the capacitor, a lead secondary battery, a combination of these, or the like can be used as a power storage unit that outputs DC power. A dischargeable time of the capacitor 13 is, for example, set short as compared to a time necessary for the rotary machine generator 16 to start discharging. As an example, the dischargeable time of the capacitor 13 is 2 to 3 seconds, and the time necessary for the rotary machine generator 16 to start discharging after starting operation is about 1 to 2 minutes.

The LiB-PCS 14 has, for example, a function of controlling output of the LiB secondary battery 15, a function of converting DC power of the LiB secondary battery 15 into AC power and supplying the AC power to the load 3, and the like, and has a configuration of a microcomputer, a converter, and the like for executing these functions. The LiB-PCS 14 can operate, for example, in a first control mode and a second control mode, and executes different control depending on the set control mode. The first control mode is a control mode that is set in the LiB-PCS 14 when the LiB-PCS 14 receives the discharge start signal DS. The second control mode is a control mode set in the LiB-PCS 14 after the rotary machine generator 16 starts discharging. The LiB-PCS 14 in which the first control mode is set controls output of the LiB secondary battery 15 so that all power output from the LiB secondary battery 15 is supplied to the load 3. The LiB-PCS 14 in which the second control mode is set controls output of the LiB secondary battery 15 so as to cause the LiB secondary battery 15 to discharge in cooperation with output from the rotary machine generator 16.

The LiB secondary battery 15 has one or more lithium ion secondary batteries. Further, the LiB secondary battery 15 has a known configuration for monitoring voltage, current, temperature, and the like of the lithium ion secondary battery and a communication unit that communicates with the EMS 17. A detailed configuration example of the LiB secondary battery 15 will be described later.

The rotary machine generator 16 is a device that generates electric power by rotating a rotor. The power source for rotating the rotor is gasoline, gas, or the like and not particularly limited. In the present embodiment, a cogeneration system (CGS) is employed as an example of the rotary machine generator 16. The CGS is a system that collects waste heat generated during power generation while supplying the load 3 with power generated by the rotary machine generator 16. The recovered waste heat is used as steam or hot water for heat sources, air conditioning, hot water supply, and the like of a factory. The rotary machine generator 16 has a communication function and the like in addition to the power generation function, and has a configuration such as a communication unit for executing these functions. The rotary machine generator 16 starts operation when having received an operation control sigma CS1 described later.

The EMS 17 has, for example, a function for monitoring power of the power supply line PL based on data supplied from the power measuring device 18, a communication function, and so on, and has a microcomputer, a communication unit, and so on for executing these functions. In the present embodiment, the EMS 17 is configured to be capable of communicating with each of the PCS 12, the LiB-PCS 14, the LiB secondary battery 15, and the rotary machine generator 16. In other drawings, the power measuring device 18 is omitted from illustration as appropriate.

When the EMS 17 has received the discharge start signal DS from the PCS 12, the EMS 17 supplies the discharge start signal DS to the LiB-PCS 14. Further, the EMS 17 obtains information corresponding to a remaining capacity of the LiB secondary battery 15 from the LiB secondary battery 15. In the present embodiment, state of charge (SoC) is used as information corresponding to the remaining capacity. Information based on depth of discharge (DoD) or other information may be used as information corresponding to the remaining capacity. When the EMS 17 has received a signal (SoC data SD described later) indicating that the SoC has become smaller than a threshold (hereinafter referred to as a set value as appropriate), the EMS 17 outputs an operation control signal CS1 to the rotary machine generator 16.

Specific numerical examples corresponding to the respective configurations will be described. Note that these numerical values are examples for facilitating understanding of one embodiment of the present technology, and the contents of the present technology are not limited to the numerical values exemplified below.
Power demand of load 3: 6000 kW
The PCS 12 and LiB-PCS 14: 6000 kVA
The capacitor 13: 5 kWh
The LiB secondary battery 15: 1700 kW (DC (Direct Current) voltage: 624 to 750 V)

Figure 2:
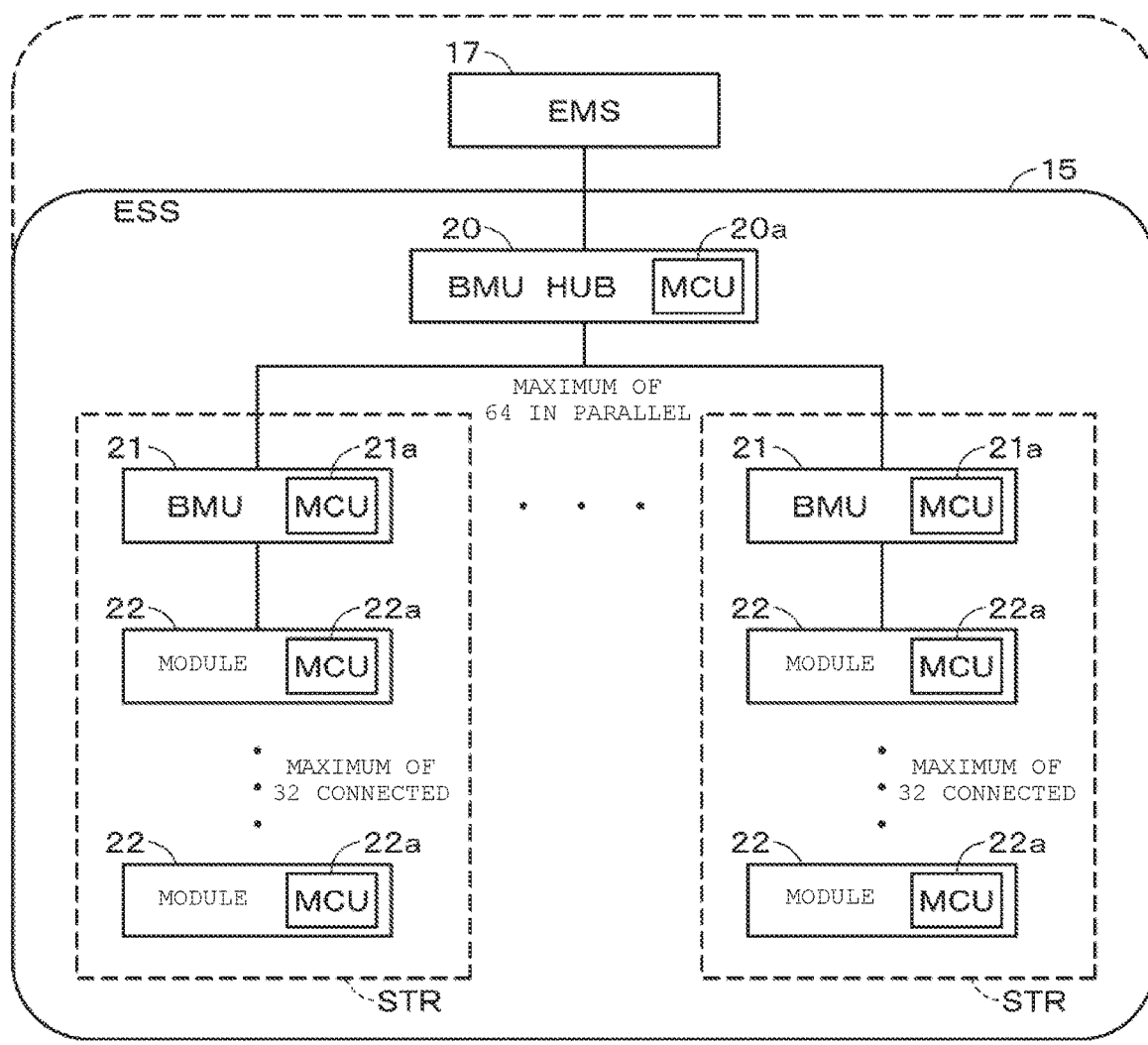
FIG. 2 is a block diagram illustrating a configuration example of an LiB secondary battery according to an embodiment of the present technology.

Next, a detailed configuration example of the LiB secondary battery 15 will be described with reference to FIG. 2. In FIG. 2, respective configurations of the LiB secondary battery 15 and the EMS 17 are illustrated. Note that the LiB secondary battery 15 may also be referred to as an energy storage system (ESS).

The LiB secondary battery 15 has a battery management unit (BMU)-HUB 20 and a string STR connected to the BMU-HUB 20. The BMU-HUB 20 has a micro-control unit (MCU) 20a for executing functions of the BMU-HUB 20. The BMU-HUB 20 is configured to be capable of communicating with the EMS 17. For example, a maximum of 64 strings STR can be connected in parallel to the BMU-HUB 20, and an appropriate number of strings SIR corresponding to necessary output connected to the BMU-HUB 20.

The string STR includes one BMU 21 and one or more modules (power storage modules) 22. The BMU 21 has an MCU 21a for executing the functions of the BMU 21. The BMU 21 is configured to be capable of communicating with the BMU-HUB 20. For example, a maximum of 32 modules 22 can be connected in series to the BMU 21, and an appropriate number of modules 22 corresponding to a necessary output are connected to the BMU 21.

The module 22 has a battery unit constituted of a lithium ion secondary battery and an MCU 22a for executing functions of the module 22.

The lithium ion secondary battery in the present embodiment is a lithium ion secondary battery including a positive electrode active material and a carbon material such as graphite as a negative electrode active material, and includes a positive electrode active material having an olivine structure as a positive electrode material.

More preferably, the positive electrode active material having an olivine structure is preferably a lithium iron phosphate compound ($LiFePO_4$) or a lithium iron complex phosphate compound containing heteroatoms ($LiFe_xM_{1-x}O_4$: M represents one or more types of metal, and x is 0<x<1). When two or more types of M are included, they are selected so that the sum of subscripts is 1−x.

Examples of M include transition elements, group IIA elements, group IIA elements, group IIIB elements, group IVB elements, and the like. In particular, those containing at least one type of cobalt (Co), nickel, manganese (Mn), iron, aluminum, vanadium (V), or titanium (Ti) are preferable.

As to the positive electrode active material, the surface of the lithium iron phosphate compound or lithium iron composite phosphate compound may be provided with a coating layer including a metal oxide (one selected from, for example, Ni, Mn, Li, or the like) or phosphate compound (for example, lithium phosphate or the like) having a composition different from that of the above-mentioned lithium iron phosphate compound or lithium iron composite phosphate compound.

A lithium composite oxide such as lithium cobaltate ($LiCoO_2$), lithium nickelate ($LiNiO_2$), and lithium manganate ($LiMnO_2$) having a laminar rock salt structure, and lithium manganate ($LiMn_2O_4$) with spinel structure may be used as a positive electrode material capable of storing and releasing lithium (Li).

There is no limitation in particular as the graphite used as the negative electrode active material, and a wide variety of graphite materials used in the industry can be used. As a negative electrode material, lithium titanate, silicon (Si)-based material, tin (Sn)-based material, or the like may be used.

The method for producing the battery electrode is not particularly limited, and a wide variety of methods used in the industry can be used.

As an electrolyte solution used for the present technology is not particularly limited, and a wide variety of electrolyte solutions used in the industry including ones in liquid forms and gel forms can be used.

For example, 16 battery blocks are connected, each including eight lithium ion secondary batteries (single cells) described above connected in parallel. Connecting 8 batteries in parallel is called 8P (Parallel), and connecting 16 battery blocks in series is called 16S (Series). Thus, the battery unit of the module 22 has an 8P16S configuration. When an average output of the lithium ion secondary batteries is 3.2 V (volt), one module 22 outputs 51.2 V (16×3.2 V).

The MCU 22a of the module 22 monitors voltage, current, and temperature of each battery block, and outputs monitoring results to a higher BMU 21 as battery information. Note that monitoring of voltage and so on may be performed in units of cells or a plurality of battery blocks. The battery information is appropriately converted into digital data and output. AD (Analog to Digital) conversion processing and so on are performed by the MCU 22a.

The BMU 21 manages charging and discharging of each module 22 by appropriately turning on and off charging and discharging control switches (the switch SW1 and the switch SW2 in FIG. 7 described later) based on battery information transmitted from each module 22. The switches SW1 and SW2 are normally on (conductive state) and are turned off when an abnormality occurs. In addition, when a plurality of modules 22 are applied, the BMU 21 performs a balancing process so that the degree of deterioration does not vary among the modules 22. The BMU 21 transmits the battery information transmitted from each module 22 to the BMU-HUB 20. The BMU-HUB 20 outputs SoC data SD to the EMS 17 when, for example, the SoC of the module 22 becomes smaller than 50% (half capacity). When a plurality of modules 22 are applied, the BMU-HUB 20 outputs the SoC data SD to the EMS 17 when the smallest SoC among the modules 22 becomes smaller than 50%. The BMU-HUB 20 may output the SoC data SD to the EMS 17 as needed.

The EMU 17 may be referred to as an integrated controller or the like, and the BMU may each be referred to as a control box or the like.

Figure 3:
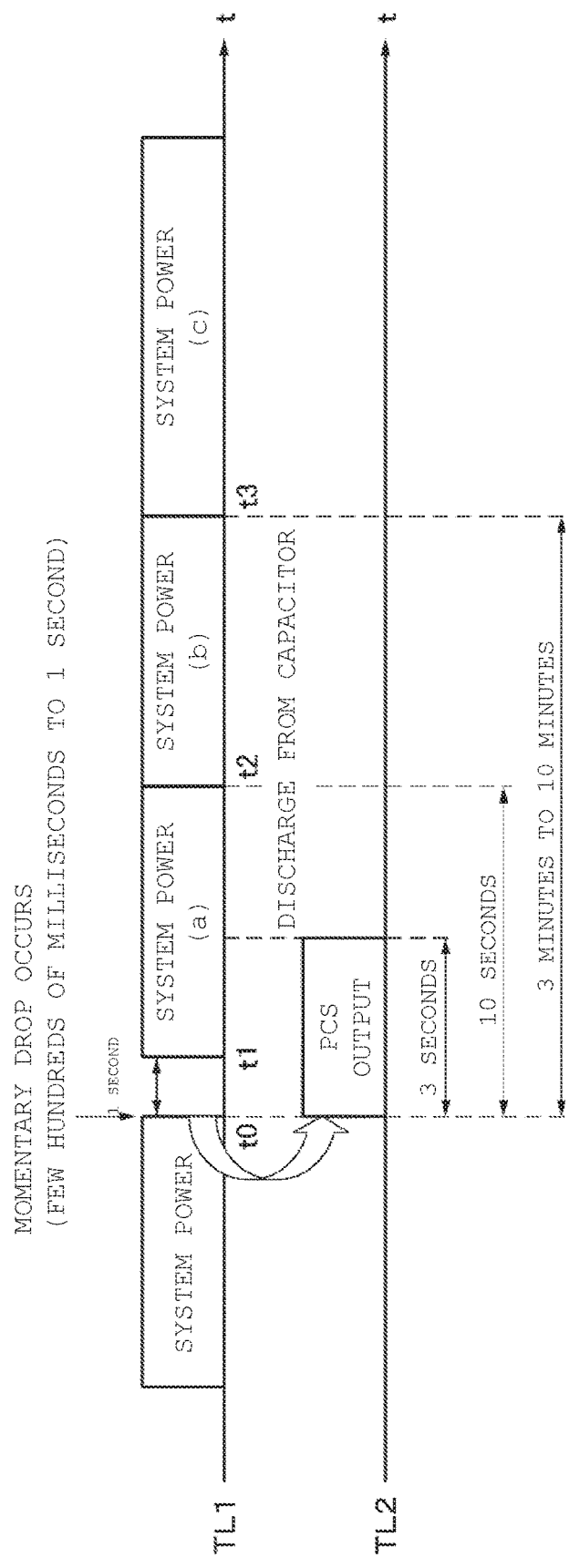
FIG. 3 is a diagram for describing an operation example and the like of a power control apparatus according to an embodiment of the present technology.
Figure 4:
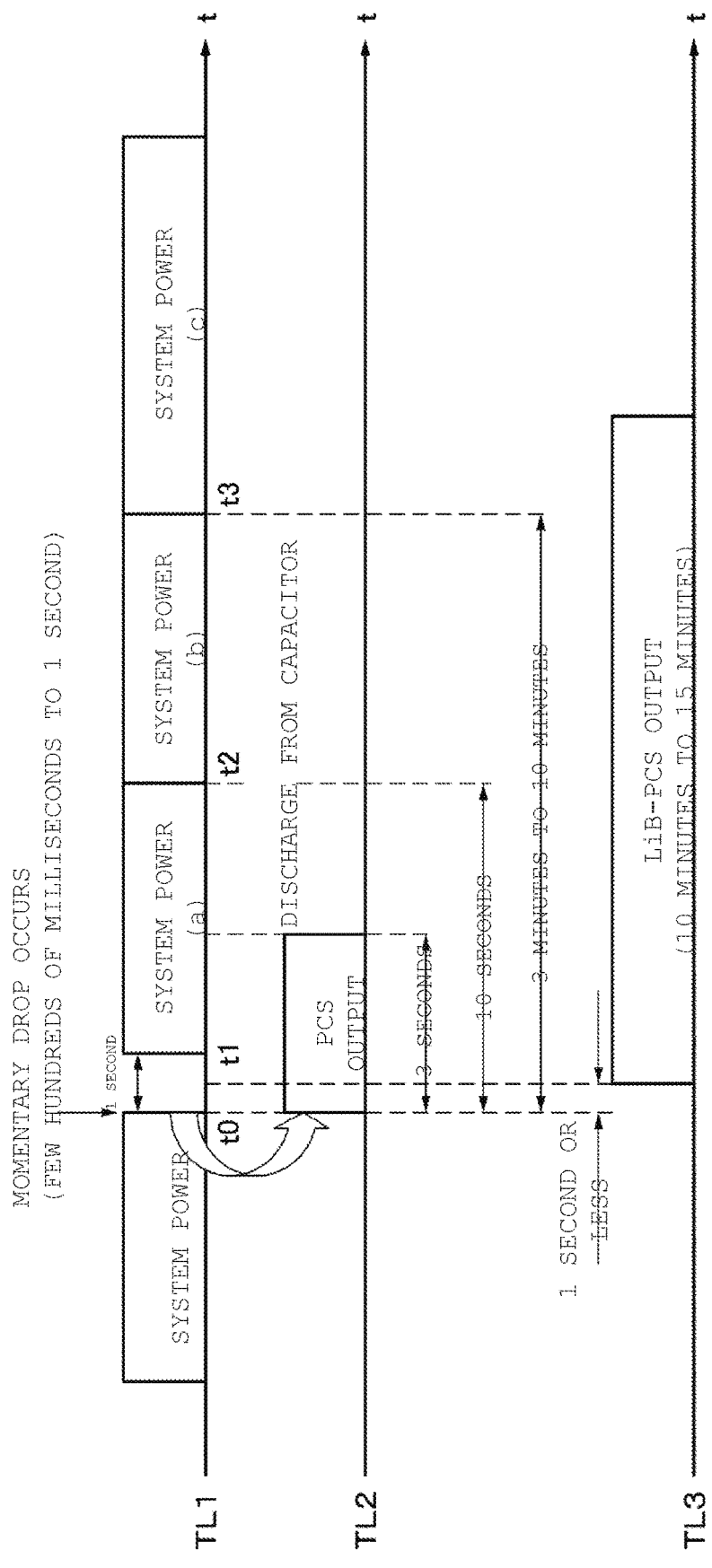
FIG. 4 is a diagram for explaining an operation example and the like of the power control apparatus according to an embodiment of the present technology.
Figure 5:
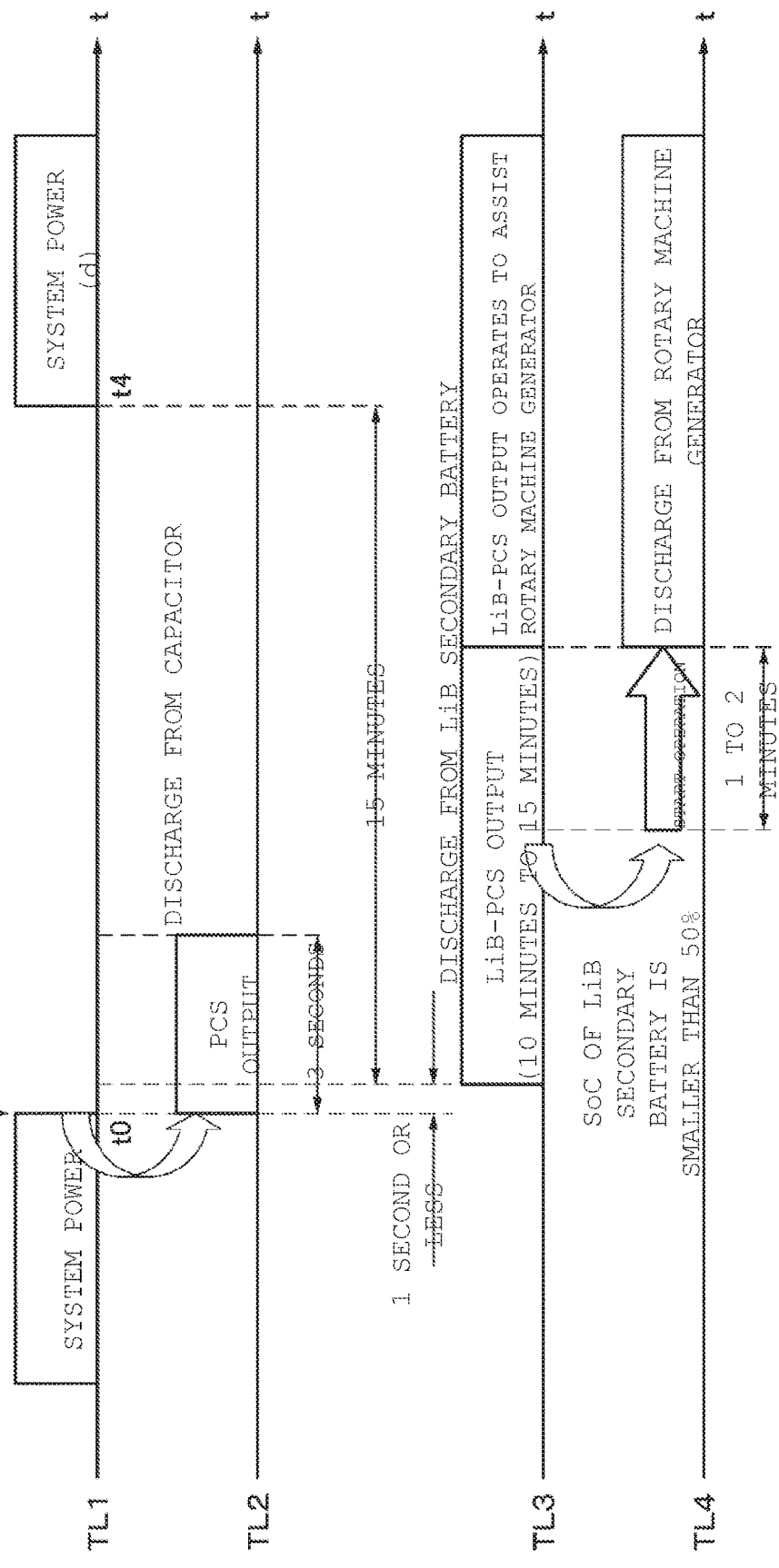
FIG. 5 is a diagram for explaining an operation example and the like of the power control apparatus according to an embodiment of the present technology.

Next, with reference to FIGS. 3 to 5, operation of the power control apparatus 1 will be schematically described while referring to problems to be considered in the power control apparatus 1. Axes in FIGS. 3 to 5 (arrows from a left side to a right side in charts) indicate time axes. A time axis TL1 is a time axis corresponding to a time when a phenomenon that the voltage of the system power 2 falls below a threshold and a time when the voltage recovers and the system power 2 is restore. In FIGS. 3 to 5, for example, a pattern in which the voltage of the system power 2 decreases at time t0 and the system power 2 is restored at time t1 that is one second after time t0 (system power (a)) (momentary drop), a pattern in which the system power 2 is restored at time t2 that is 10 seconds after time t0 (system power (b)), a pattern in which the system power 2 is restored at time t3 that is 3 to 10 minutes after time t0 (system power (c)), and a pattern in which the system power 2 is restored at time t4 that is 15 minutes after the time t0 (system power (d)) are illustrated.

Further, a time axis TL2 indicates a period during which the capacitor 13 discharges, a time axis TL3 indicates a period during which the LiB secondary battery 15 discharges, and a time axis TL4 indicates a period during which the rotary machine generator 16 discharges.

As illustrated in FIG. 3, when the voltage of the system power 2 falls below the threshold at time t0, power supply from the system power 2 is interrupted, and the capacitor 13 starts discharging according to control by the PCS 12. Electric power is output from the capacitor 13 in a short time (for example, 1 ms to 2 ms or less) from time t0. The capacitor 13 is generally configured to have a dischargeable period of about 3 seconds in consideration of cost and the like. As illustrated in FIG. 3, when the voltage drop is a momentary drop and the power is restored at time t1, the power supply to the load 3 can be continued by the power output from the capacitor 13. However, if the time during which the voltage drop of the system power 2 continues exceeds the dischargeable period of the capacitor 13, such as when the power is restored at time t2, the power supply to the load 3 is interrupted. Although an apparatus using a lead secondary battery can be considered instead of the capacitor 13, the dischargeable time of the lead secondary battery is generally about 2 to 3 minutes. This is because, in order to secure a longer dischargeable time, a large number of lead secondary batteries are necessary, which is disadvantageous in terms of cost, space for arranging the lead secondary batteries, an increase in weight, and the like. Even when the lead secondary battery is used, the same problem can occur when the time during which the voltage drop of the system power 2 continues is longer than several minutes.

Accordingly, in the present embodiment, as illustrated in FIG. 4, immediately after the capacitor 13 starts discharging, the LiB secondary battery 15 starts discharging according to control by the LiB-PCS 14 (for example, within 1 second). The LiB secondary battery 15 is configured to have a dischargeable time of, for example, 10 minutes to 15 minutes, and thus it is possible to continue the power to the load 3 even when a power failure occurs for a relatively long time from time to, and the capacitor 13 has no remaining capacity and the capacitor 13 stops discharging. Since the LiB secondary battery 15 is capable of outputting high power, even when the LiB secondary battery 15 is configured to have a dischargeable time of, for example, 10 minutes to 15 minutes, it is possible to prevent the arrangement space thereof from greatly increasing.

It is also conceivable that the power supply from the system power 2 is stopped for a longer time (for example, 15 minutes or more). As described above, although the dischargeable time of the LiB secondary battery 15 is longer than that of the capacitor 13, when the power supply from the system power 2 is stopped for a long time, the remaining capacity of the LiB secondary battery 15 continues to decrease. Eventually, the discharge from the LiB secondary battery 15 stops and the power supply to the load 3 becomes impossible.

Accordingly, in the present embodiment, as illustrated in FIG. 5, when the SoC of the LiB secondary battery 15 becomes smaller than a set value (for example, 50%), the rotary machine generator 16 starts to operate. A certain time (for example, about 1 to 2 minutes) is needed until the rotary machine generator 16 starts operating and actually starts discharging. Accordingly, the set value for the SoC is appropriately set so that the rotary machine generator 16 starts to operate when the remaining capacity of the LiB secondary battery 15 is relatively large.

The set value for the SoC may be changed according to the state of the load, that is, the necessary power amount. For example, when the load is larger than a predetermined value, operation of the rotary machine generator 16 is started when the SoC becomes smaller than 50%, and when the load is smaller than the predetermined value, operation of the rotary machine generator 16 is started when the SoC becomes smaller than 30%. In this way, start of operation of the rotary machine generator 16 can be delayed by changing the set value of the SoC for starting operation of the rotary machine generator 16 according to the size of the load.

All of the power output from the LiB secondary battery 15 is supplied to the load 3 until the rotary machine generator 16 starts discharging. On the other hand, after the rotary machine generator 16 starts discharging, the LiB-PCS 14 operates in the second control mode, and thus output of the LiB secondary battery 15 helps (assists) output of the rotary machine generator 16. A voltage fluctuation or a frequency fluctuation may occur in output of the rotary machine generator 16 when a sudden power load fluctuation occurs. Thus, switching to output control linked to output voltage and frequency of the rotary machine generator 16 is performed without stopping the discharge from the LiB secondary battery 15 even after the rotary machine generator 16 starts discharging.

Specifically, a voltage drop or frequency fluctuation that may occur when a sudden load fluctuation occurs is compensated by output from the LiB secondary battery 15. In this manner, stable power supply to the load 3 becomes possible, Incidentally, a system is also conceivable that responds to a power outage for a long time by increasing the capacitance of the capacitor 13 to allow discharge for several minutes, and continuing the power supply to the load 3 by always starting operation of the rotary machine generator 16 after the capacitor 13 starts discharging. However, once the rotary machine generator 16 is operated, it is necessary to perform maintenance every time, and operation costs increase. For this reason, it is desirable not to start the rotary machine generator 16 as much as possible. In the present embodiment, it is possible to lengthen the power supply to the load 3 compared to the configuration with the capacitor 13 alone by discharging the LiB secondary battery 15, and thus start of operation of the rotary machine generator 16 can be delayed. Therefore, it is possible to prevent the rotary machine generator 16 from being started frequently, and it is possible to reduce costs (operation costs) related to maintenance of the entire power control apparatus 1 and to prevent deterioration of the equipment.

Further, in a configuration in which a configuration related to power generation is controlled by a single controller, the controller and the like need to be changed along with a change in the configuration related to power generation, and existing equipment that is generally used cannot be used. However, in the present embodiment, it is only necessary to add the LiB secondary battery 15 and the configuration for performing output control thereof to the commonly used configuration of the HSS 10, the capacitor 13, and so on. The existing equipment can be used, and at the same time, costs of additional investment can be reduced.

Figure 6:
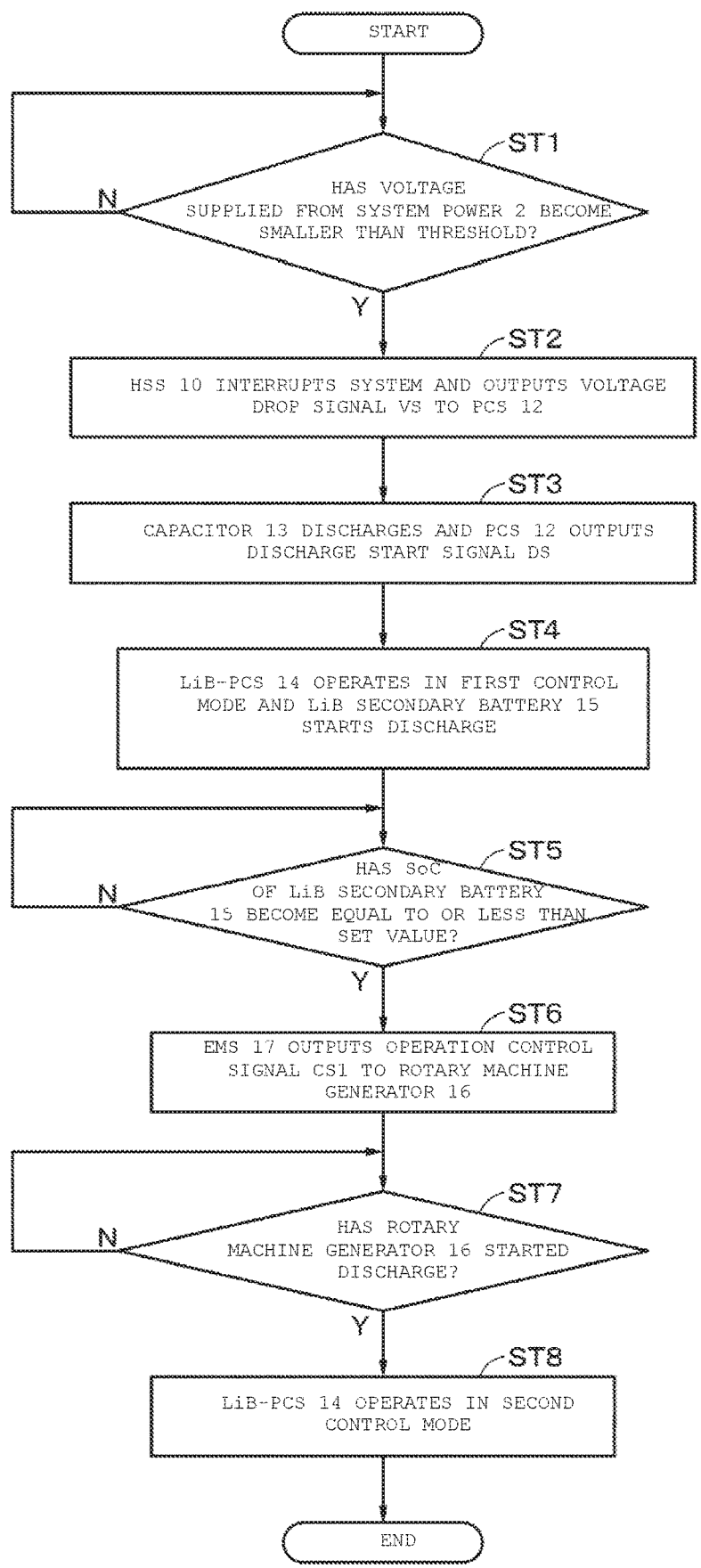
FIG. 6 is a flowchart illustrating a process flow of the power control apparatus according to an embodiment of the present technology.
Figure 7:
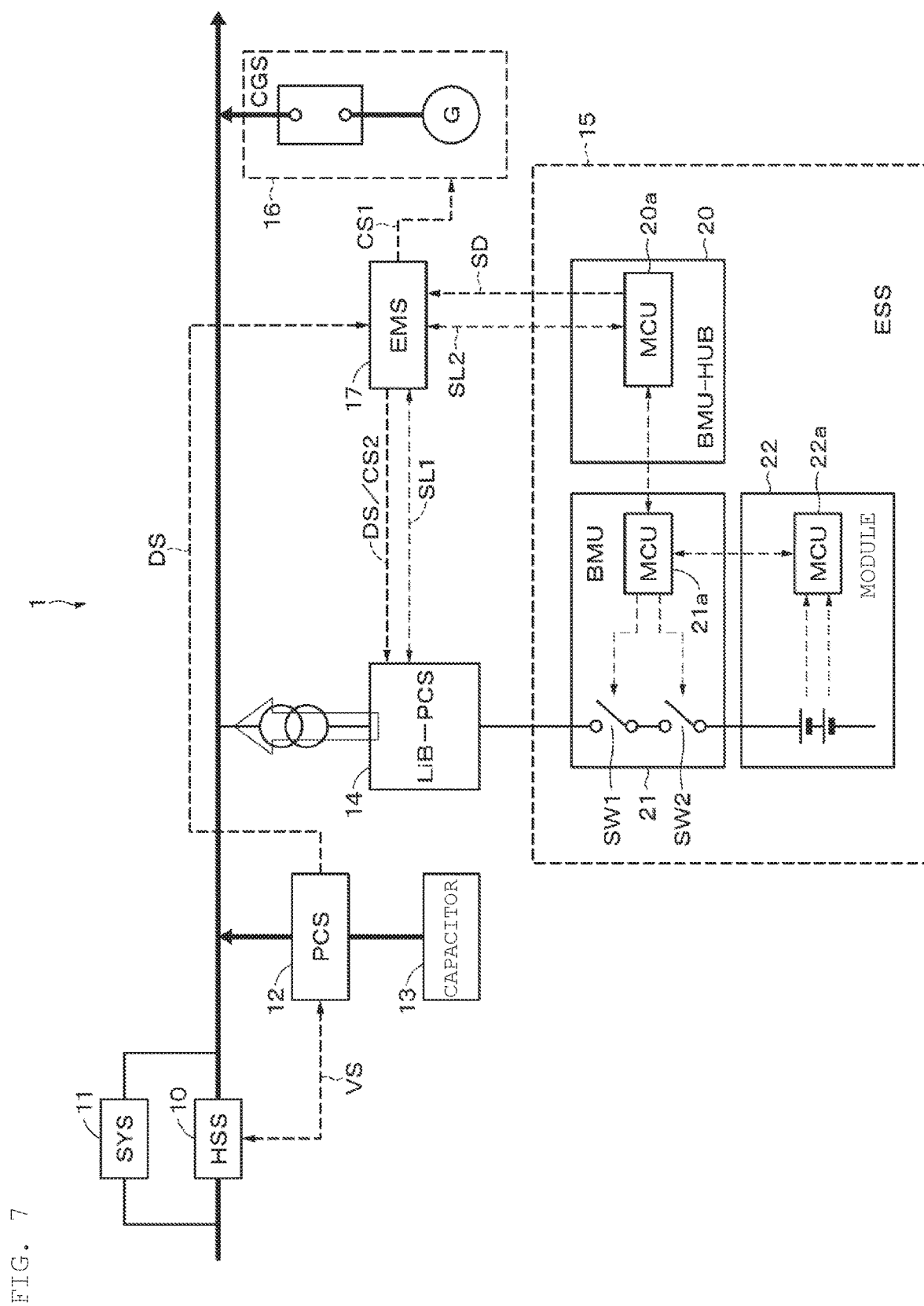
FIG. 7 is a diagram for explaining a signal flow in the power control apparatus according to an embodiment of the present technology.

Next, an operation example of the power control apparatus 1 will be described with reference to FIGS. 6 and 7. FIG. 6 is a flowchart illustrating an operation flow of the power control apparatus 1. FIG. 7 is a diagram mainly illustrating a signal flow (dotted arrow) in the power control apparatus 1.

In step ST1, the HSS 10 determines whether or not the voltage of power supplied from the system power 2 has become smaller than a threshold. The HSS 10, for example, periodically monitors the voltage of power supplied from the system power 2. Being smaller than the threshold may either be equal to or less than the threshold or less than the threshold. Being larger than the threshold may mean being equal to or larger than the threshold, or being larger than the threshold (the same applies to similar expressions in other parts). Here, when the voltage of power supplied from the system power 2 is larger than the threshold, the process returns to step ST1, and the determination process of step ST1 is repeated. When the voltage of power supplied from the system power 2 becomes smaller than the threshold, the process proceeds to step ST2.

In step ST2, the HSS 10 interrupts the system and interrupts the power supply from the system power 2, and outputs the voltage drop signal VS to the PCS 12. Then, the process proceeds to step ST3.

In step ST3, the PCS 12 that has received the voltage drop signal VS performs control to convert DC power supplied from the capacitor 13 into AC power and supply the AC power to the load 3. The capacitor 13 stops discharging after a predetermined period until the capacitance runs out (for example, after several seconds). Further, the PCS 12 outputs a discharge start signal DS. Then, the process proceeds to step ST4.

In step ST4, the discharge start signal DS output from the PCS 12 is received by the EMS 17. The EMS 17 supplies the discharge start signal DS to the LiB-PCS 14 using a predetermined communication line SL1 between the EMS 17 and the LiB-PCS 14. Thus, in the present embodiment, the discharge start signal DS output from the PCS 12 is supplied to the LiB-PCS 14 through the EMS 17. The LiB-PCS 14 that has received the discharge start signal DS performs control to cause the LiB secondary battery 15 to discharge, converts DC power output from the LiB secondary battery 15 into AC power, and supplies the AC power to the load 3. Note that in step ST4, the LiB-PCS 14 operates in the first control mode, and supplies all of the power output from the LiB secondary battery 15 to the load 3. Then, the process proceeds to step ST5.

In step ST5, it is determined whether or not the SoC of the LiB secondary battery 15 has become smaller than a set value (for example, 50%). The SoC of the module 22 constituting the LiB secondary battery 15 is monitored by the MCU 22a, and a monitoring result is supplied to the MCU 20a of the BMU-HUB 20 through the MCU 21a of the higher BMU 21. The MCU 20a determines whether or not the SoC of the module 22 has become smaller than 50%. When a plurality of modules 22 are used, for example, it is determined whether or not the smallest SoC is smaller than 50%.

If the SoC of the LiB secondary battery 15 is larger than 50%, the process returns to step ST5, and the determination process of step ST5 is repeated. When the SoC of the LiB secondary battery 15 is smaller than 50%, the MCU 20a supplies SoC data SD indicating that the SoC is smaller to the EMS 17 using a predetermined communication line SL2 between the EMS 17 and the LiB secondary battery 15. Then, the process proceeds to step ST6.

In step ST6, the EMS 17 that has received the SoC data SD outputs an operation control signal CS1. The operation control signal CS1 output from the EMS 17 is received by the rotary machine generator 16. Then, the process proceeds to step ST7.

The rotary machine generator 16 that has received the operation control signal CS1 starts operation. A predetermined time (for example, about 1 to 2 minutes) is necessary until the rotary machine generator 16 having started operation starts discharging. In step ST7, the EMS 17 determines whether or not the rotary machine generator 16 has started discharging.

For example, a time until the rotary machine generator 16 starts discharging after outputting the operation control signal CS1 is stored in advance in the EMS 17, and when the time has elapsed after outputting the operation control signal CS1, the EMS 17 can recognize that the rotary machine generator 16 has started discharging. In addition, the rotary machine generator 16 may supply the EMS 17 with a discharge start signal indicating that the rotary machine generator 16 has started discharging so that the EMS 17 recognizes that the rotary machine generator 16 has started discharging. In step ST7, when the rotary machine generator 16 has not started discharging, the process returns to step ST7, and the determination process of step ST7 is repeated. When the rotary machine generator 16 starts discharging, the process proceeds to step ST8.

In step ST8, the EMS 17 having recognized that the rotary machine generator 16 has started discharging supplies an operation control signal CS2 to the LiB-PCS 14. The LiB-PCS 14 that has received the operation control signal CS2 switches the control mode from the first control mode to the second control mode, and controls output from the LiB secondary battery 15 in the second control mode. By the LiB-PCS 14 operating in the second control mode, output from the LiB secondary battery 15 is controlled so that, for example, a voltage drop and a frequency fluctuation that may occur when a sudden load change occurs are compensated by output of the LiB secondary battery 15. With the processing described above, the power supply to the load 3 can be continued when a momentary drop occurs and also when power supply from the system power 2 is stopped for a long time.

Although not illustrated in the flowchart illustrated in FIG. 6, when the system power 2 is restored, for example, a signal indicating the restoration of the power is supplied from the HSS 10 to the PCS 12, the LiB-PCS 14, and the rotary machine generator 16, so as to perform control to stop discharge from the capacitor 13, the LiB secondary battery 15, and the rotary machine generator 16. When the HSS 10 is turned on, power of the system power 2 is supplied to the load 3. Note that when the voltage from the system power 2 recovers, the SYS 11 performs synchronization control to turn on the HSS 10 after synchronizing the voltage cycle of the system power 2 with the voltage cycle of the voltage supplied to the load 3. Further, when the power is restored, the capacitor 13 and the LiB secondary battery 15 are charged by power from the system power 2 through the PCS 12 and the LiB-PCS 14, respectively.

Although the embodiments of the present technology have been described concretely above, the embodiments described above are not limiting, and various modifications based on the technical idea of the present technology are possible.

Figure 8:
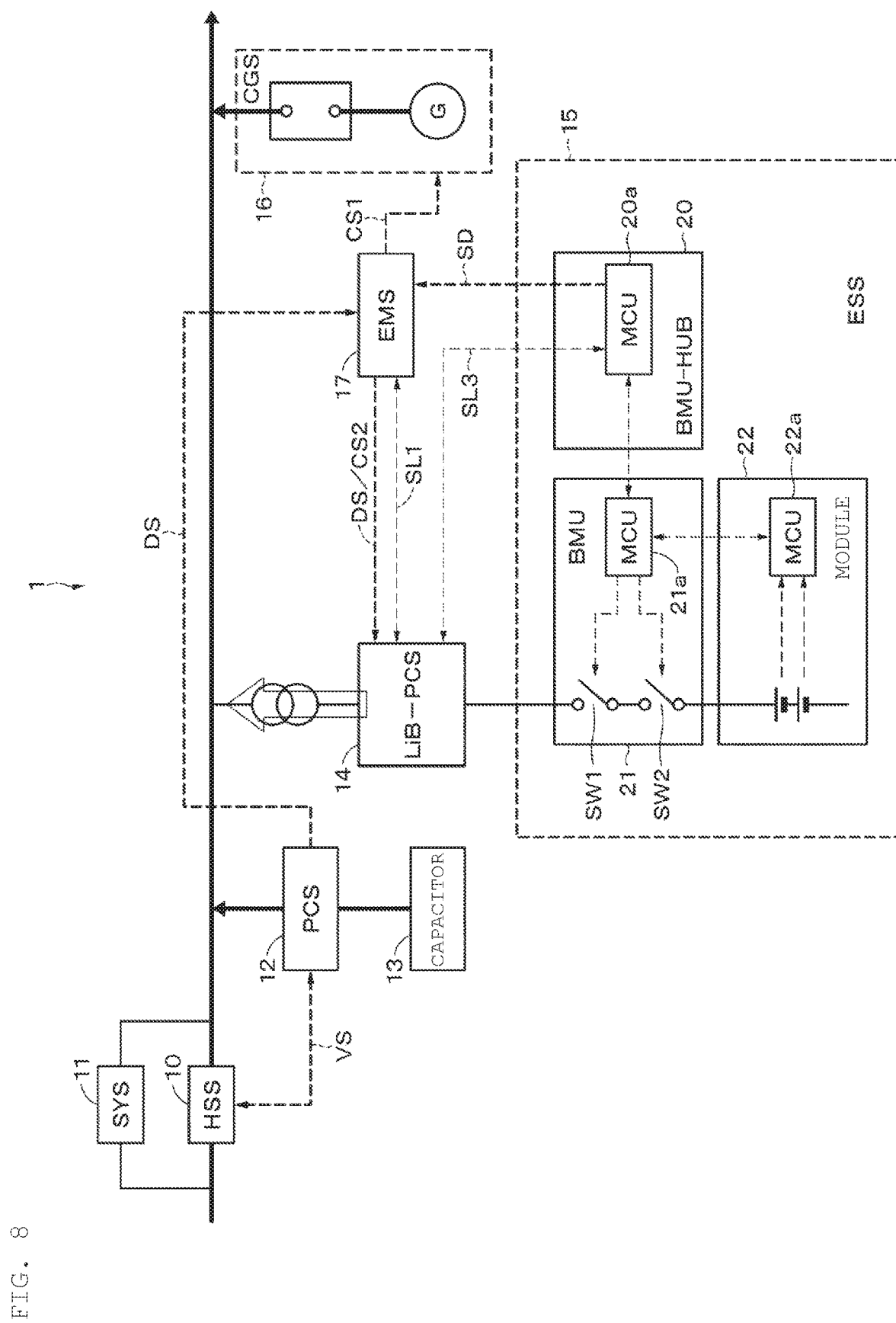
FIG. 8 is a diagram for explaining a modification example according an embodiment of the present technology.
Figure 9:
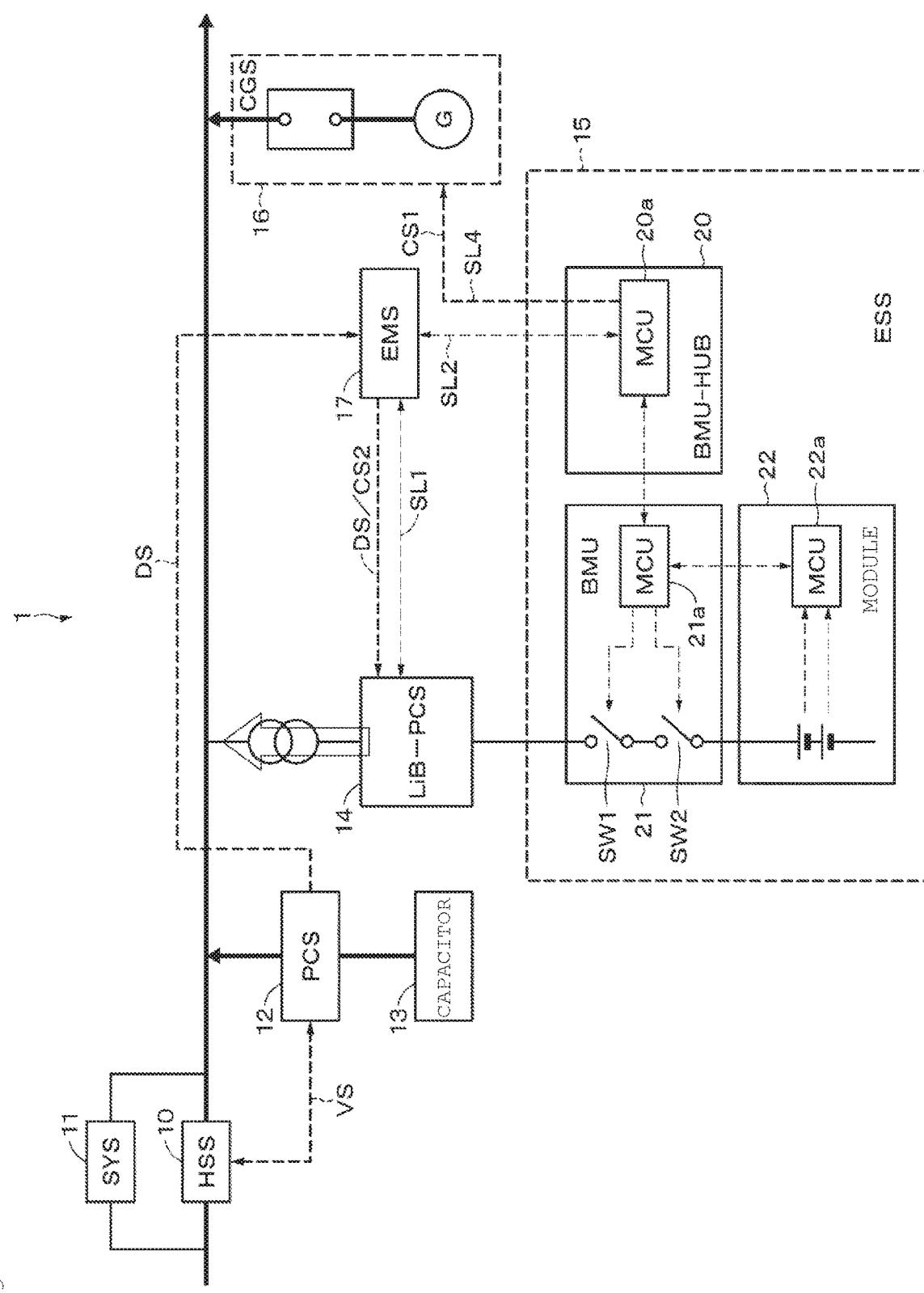
FIG. 9 is a diagram for explaining a modification example according an embodiment of the present technology.

In an embodiment described above, the paths of communication performed between the components can be changed as appropriate. For example, as illustrated in FIG. 8, a communication line SL3 may be set between the LiB-PCS 14 and the LiB secondary battery 15 so that the LiB-PCS 14 and the MCU 20a of the BMU-HUB 20 communicate with each other. Further, as illustrated in FIG. 9, a communication line SL4 may be set between the LiB secondary battery 15 and the rotary machine generator 16. Then, the MCU 20a of the BMU-HUB 20 may be configured to output the operation control signal CS1 when the SoC of the module 22 becomes smaller than a set value, and the operation control signal CS1 may be supplied to the rotary machine generator 16 without passing through the EMS 17. In this way, respective components may communicate without intervention of the EMS 17. Instead of providing the EMS 17, other configurations may have the functions of the EMS 17 in a sharing manner. Note that the communication may be wired communication, wireless communication, or communication using both wired and wireless communication.

In an embodiment described above, the EMS 17 may perform the process of determining whether or not the SoC of the module 22 has become smaller than 50% (the process of step ST5). For example, the MCU 20a of the BMU-HUB 20 periodically transmits the SoCs of all the modules 22 to the EMS 17. The EMS 17 determines whether or not there is a module 22 having an SoC smaller than 50%. Then, when there is a module 22 having an SoC smaller than 50%, the EMS 17 may supply the operation control signal CS1 to the rotary machine generator 16 similarly to one embodiment described above.

In an embodiment described above, when the rotary machine generator 16 can supply stable power to the load 3, control may be performed to stop the output from the LiB secondary battery 15 after the rotary machine generator 16 has discharged.

In an embodiment described above, when one string STR is applied as the LiB secondary battery 15, the power control apparatus 1 may have no BMU-HUB 20.

In an embodiment described above, the capacitor 13 and the LiB secondary battery 15 may be charged with power supplied from the system power 2.

The configurations, methods, steps, shapes, materials, numerical values, and the like given in the embodiments described above are merely examples, and different configurations, methods, steps, shapes, materials, numerical values, and the like may be used as necessary. The present technology can be realized in any form such as a method, a system, a program, and a storage medium storing the program.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A power control apparatus comprising:
a switch configured to interrupt power supply from a system power when the switch detects a drop of voltage from the system power below a threshold;
a first power controller configured to receive a voltage drop signal supplied from the switch;
a first power storage unit connected to the first power controller;
a second power controller configured to receive a discharge start signal supplied from the first power controller;
a second power storage unit connected to the second power controller; and
a rotary machine generator configured to receive an operation control signal supplied from the second power controller or the second power storage unit.

2. The power control apparatus according to claim 1, wherein when the switch detects a drop of the voltage from the system power below the threshold, the switch outputs the voltage drop signal.

3. The power control apparatus according to claim 2, wherein when the first power controller receives the voltage drop signal, the first power controller performs control to supply power from the first power storage unit to a load and outputs the discharge start signal.

4. The power control apparatus according to claim 3, wherein when the second power controller receives the discharge start signal, the second power controller performs control to supply power from the second power storage unit to the load.

5. The power control apparatus according to claim 4, wherein the second power controller or the second power storage unit outputs the operation control signal when a remaining capacity of the second power storage unit is smaller than a set value.

6. The power control apparatus according to claim 5, wherein the set value is set according to a size of the load.

7. The power control apparatus according to claim 6, wherein when the rotary machine generator receives the operation control signal, the rotary machine generator starts operation.

8. The power control apparatus according to claim 7, wherein when the second power controller receives the discharge start signal, the second power controller supplies power output from the second power storage unit to the load by operating in a first control mode, and after the rotary machine generator starts discharging, the second power controller supplies power output from the second power storage unit to the load by operating in a second control mode.

9. The power control apparatus according to claim 8, wherein the first control mode includes a mode for controlling the second power storage unit so as to supply all power output from the second power storage unit to the load, and the second control mode includes a mode for controlling the second power storage unit so as to cause the second power storage unit to discharge in cooperation with output from the rotary machine generator.

10. The power control apparatus according to claim 8, wherein the second power controller switches a control mode from the first control mode to the second control mode after a predetermined period since outputting of the operation control signal.

11. The power control apparatus according to claim 8, wherein when the second power controller receives a discharge start signal from the rotary machine generator, the second power controller switches a control mode from the first control mode to the second control mode.

12. The power control apparatus according to claim 1, further comprising a synchronization controller configured to turn on the switch after synchronizing a voltage cycle of the system power with a voltage cycle of a voltage supplied to a load when the voltage from the system power recovers.

13. The power control apparatus according to claim 1, wherein a dischargeable time of the first power storage unit is shorter than a time necessary for the rotary machine generator to start discharging.

14. The power control apparatus according to claim 1, wherein the first power storage unit includes a capacitor or a lead secondary battery, and the second power storage unit includes a lithium ion secondary battery.

15. A power control method comprising:
by a switch, interrupting power supply from a system power and outputting a voltage drop signal when the switch detects a drop of voltage from the system power below a threshold;
by a first power controller, performing control to supply power to a load from a first power storage unit and outputting a discharge start signal when the first power controller receives the voltage drop signal;
by a second power controller, performing control to supply power to the load from a second power storage unit when the second power controller receives the discharge start signal; and
by a rotary machine generator, starting operation to supply power to the load when the rotary machine generator receives an operation control signal from the second power controller or the second power storage unit.

16. The power control method according to claim 15, wherein when a remaining capacity of the second power storage unit is smaller than a threshold, the second power controller or the second power storage unit outputs the operation control signal to the rotary machine generator.

* * * * *